United States Patent

[11] 3,589,476

[72] Inventor Anthony C. Evans
 Westland, Mich.
[21] Appl. No. 865,626
[22] Filed Oct. 13, 1969
[45] Patented June 29, 1971
[73] Assignee Kelsey-Hayes Company

[54] SELF-ADJUSTING DRUM TYPE BRAKE
 6 Claims, 4 Drawing Figs.
[52] U.S. Cl. .................................................. 188/79.5,
 188/196
[51] Int. Cl. ...................................................... F16d 51/52,
 F16d 65/56
[50] Field of Search .......................................... 188/79.5
 GC, 79.5 B, 196

[56] References Cited
UNITED STATES PATENTS
3,010,544 11/1961 Dahle et al. ................... 188/79.5 (GC)
3,114,438 12/1963 Helvern ........................ 188/79.5 (GC)
3,338,344 8/1967 Hill .............................. 188/79.5 (GC)

Primary Examiner—Duane A. Regar
Attorney—Harness, Dickey and Pierce

ABSTRACT: a drum-type brake embodying a self adjusting mechanism. The self adjusting mechanism includes an adjusting lever that is pivotally supported upon a supporting lever which is, in turn, pivotally supported upon the web of one of the brake shoes. During normal adjusting procedure, the adjusting lever pivots relative to its supporting lever to accomplish the adjustment. If for some reason the adjusting mechanism binds, both the adjusting lever and the supporting lever will pivot so that the adjusting lever does not affect any adjustment thus reducing the likelihood of damage to the components.

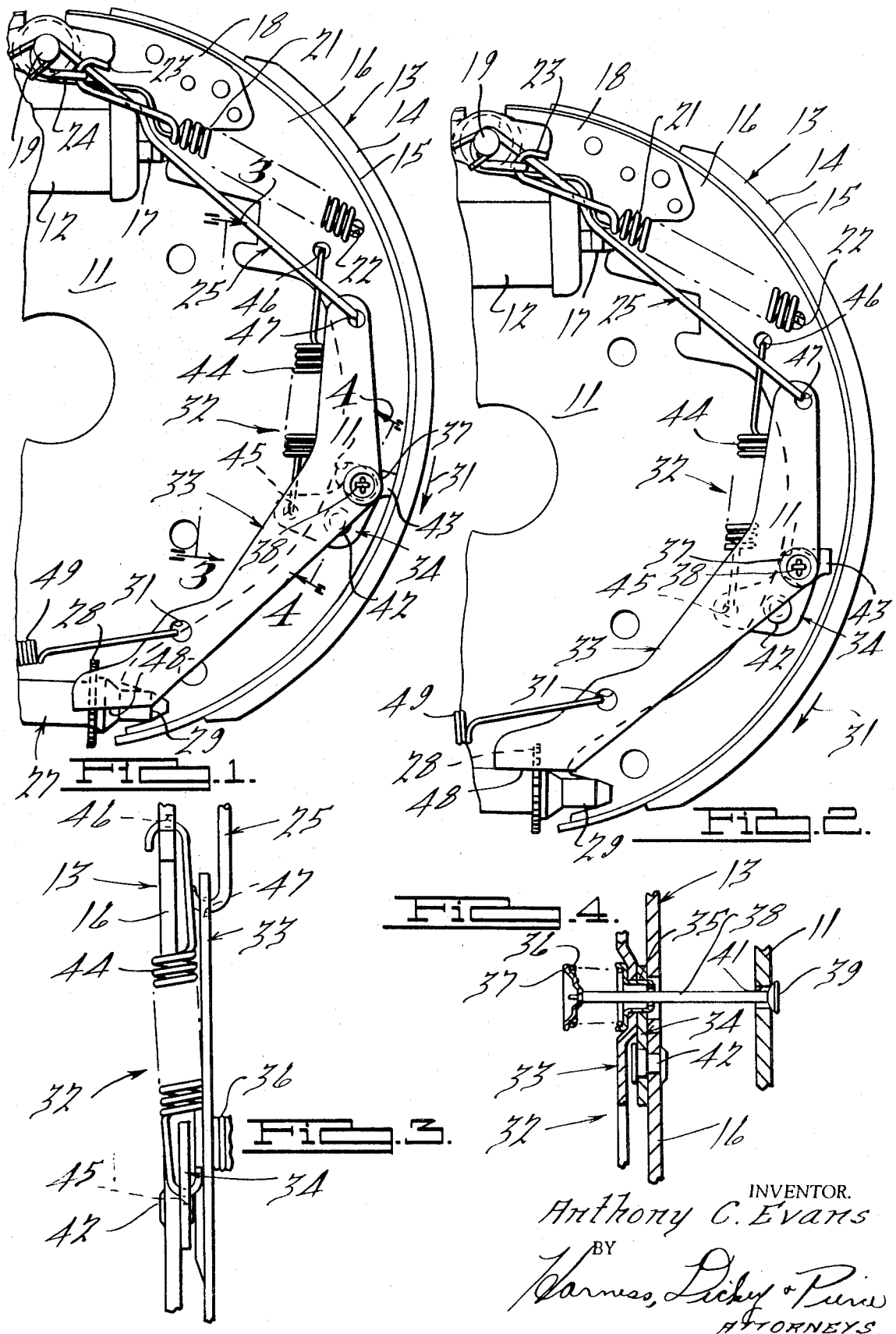

3,589,476

SELF-ADJUSTING DRUM TYPE BRAKE

BACKGROUND OF THE INVENTION

This invention relates to a self-adjusting drum type brake and more particularly to an improved automatic adjusting mechanism for such a brake.

In one well-known type of automatically adjusted drum type brake, an adjusting lever is pivotally supported upon one of the brake shoes and has an end which turns the star wheel of the brake adjuster upon excessive brake movements for effecting an adjustment. If the brake adjuster is at the extreme limit of its movement or if it cannot be turned due to damage or the excess accumulation of dirt, damage to the adjuster, adjusting lever or other components of the mechanism may occur if the adjusting lever pivots in the normal fashion upon excess movement. In order to prevent such damage, means have been proposed for permitting the adjusting lever to move so that it will pivot about the end that engages the star wheel in the event the star wheel cannot be rotated. This has generally been accomplished by providing a pivot point for the adjusting lever that may also slide with respect to the brake shoe that supports it in the event of such a malfunction. Some form of spring arrangement generally resists this sliding movement and will yield upon the aforenoted malfunction. The devices previously proposed for this purpose have been somewhat complicated and the use of a sliding pivot point introduces the possibility of excessive wear and damage.

It is, therefore, a principal object of this invention to provide an improved automatic adjusting mechanism for a drum type brake.

It is another object of this invention to provide an automatic adjusting mechanism that will, in effect, yield when the adjustment cannot be accomplished for some reason.

It is a further object of this invention to provide an improved, yielding pivotal support for the adjusting lever of an automatic adjusting drum-type brake.

SUMMARY OF THE INVENTION

This invention is particularly adapted to be embodied in an automatic adjusting mechanism for a drum type brake having a shoe with a frictional lining and a web, an extensible mechanism for determining the at rest position of the shoe and an adjusting lever pivotally movable in response to a predetermined amount of movement of the shoe for adjusting the extensible mechanism. The invention comprises a supporting lever supported upon the web of the shoe for pivotal movement about a first pivot axis. Means supporting the adjusting lever for pivotal movement about a second pivot axis upon the supporting lever. The adjusting lever is movable about the second axis for operation of the extensible mechanism. The supporting lever is pivotal about the first axis when the adjusting lever pivots about the second axis and when the extensible mechanism cannot be extended for precluding damage to the automatic adjusting mechanism.

BRIEF DESCRIPTION OF THE DRAWINGS

FIG. 1 is a partial elevational view, with portions removed, of a drum type brake embodying this invention showing the automatic adjusting mechanism in an adjusting position.

FIG. 2 is an elevational view, in part similar to FIG. 1, showing the adjusting mechanism in the position it occupies when an adjustment cannot be made for some reason.

FIG. 3 is an enlarged view taken in the direction of the arrow 3—3 in FIG. 1.

FIG. 4 is an enlarged cross-sectional view taken along the line 4—4 of FIG. 1.

DETAILED DESCRIPTION OF THE PREFERRED EMBODIMENT

The drawings illustrate a portion of a drum type brake incorporating an automatic adjuster embodying this invention. In the drawings, the brake drum has been removed and only one-half of the brake is shown for the sake of illustration.

The brake assembly includes a fixed backing plate 11 that supports a wheel cylinder 12. On either side of the wheel cylinder, a brake shoe is positioned and only one of these shoes has been shown in the drawings and is represented generally by the reference numeral 13. The brake shoe 13 has a frictional lining 14 carried on a rim 15 which is reinforced by a web 16. The upper end of the web 16 is juxtaposed to a piston rod 17 of the wheel cylinder 12. In addition, the web 16 carries a reinforcing plate 18 that is normally held against an anchor pin 19 by means of a retractor spring 21. The retractor spring 21 has a first hooked end that is received in an aperture 22 in the web 16 and a second hooked end 23 that is attached to a reversely bent portion 24 of an adjusting link 25. The reversely bent portion 24 encircles the anchor pin 19, thus providing a fixed reaction against which the retractor spring 21 may act.

The opposite end of the web 16 engages an adjuster mechanism, indicated generally by the reference numeral 27. The adjuster mechanism 27 is, as is well known in this art, comprised of a screw and nut mechanism including a star wheel 28, which, when rotated, will cause a change in length of the mechanism 27. Each end of the adjuster mechanism has a forked end portion 29 that receives the web of the adjacent brake shoe. As is well known in this type of brake, when the associated drum is rotating in the direction of the arrow 31 and the wheel cylinder 12 is energized, the piston rod 17 will act on the brake shoe 13 and urge its lining into frictional engagement with the associated drum. When this occurs, the shoe 13 will tend to rotate slightly in the direction of the arrow 31 and the shoe 13 will exert a force through the adjuster mechanism 27 to the brake shoe that is not shown in the drawings.

A mechanism, indicated by the reference numeral 32, is provided for automatically adjusting the adjuster mechanism 27. This mechanism includes an adjuster link, indicated generally by the reference numeral 33. The adjuster link 33 is pivotally carried by a supporting link, indicated generally by the reference numeral 34, by means of a cup-shaped spring retainer 35 (that is shown in most detail in FIG. 4). A hold down spring 36 engages the spring retainer 35 and another spring retainer 37 that is fixed in a known manner to a hold down pin 38. The hold down pin 38 has a headed portion 39 that extends through a slotted aperture 41 in the backing plate 11 for holding the adjusting lever 33 in a generally fixed relationship to the backing plate 11.

The supporting lever 38 is pivotally supported on the web 16 by means of a rivet 42. The supporting lever 34 has a first end portion that forms a tang 43 that is normally held in engagement with the inner extremity of the rim 15 by means of a spring 44. One end of the spring 44 is received in an aperture 45 formed in the other leg of the supporting lever 34. The other end of the spring 44 is received in an aperture 46 formed in the web 16 so as to normally exert a force on the supporting lever 34 that tends to rotate it in a clockwise direction as viewed in FIGS. 1 and 2.

The adjusting link 25 extends through and is hooked into an aperture 47 formed at the upper end of the adjusting lever 33. The lower end of the adjusting lever 33 is formed with a flattened end portion 48 that is adapted to engage and coact with the teeth of the star wheel 28 in a manner which will become more apparent as this description proceeds. A tension spring 49 has one of its ends hooked into an aperture 51 formed at the lower end of the adjusting lever 33 and its other end is fixed in any suitable manner to a component of the brake assembly so as to exert a bias on the adjusting lever 33 that tends to rotate this lever in a clockwise direction.

OPERATION

The automatic adjusting mechanism 32 is adapted to rotate the star wheel 28 and extend the adjusting mechanism 27 after sufficient wear of the lining 14 has taken place. This adjustment also compensates for wear of the lining of the brake shoe that is not shown, as is well known in this art. Although other modes of operation are possible with the described construction, the automatic adjusting mechanism 32 effects this adjustment upon application of the brake when the drum is rotating in a reverse direction as indicated by the arrow 31.

FIG. 1 shows the brake assembly as it appears during a reverse rotation and when sufficient lining wear has taken place to require an adjustment. It has been previously noted that upon application of the brake with the drum rotating in the direction of the arrow 31, the piston rod 17 will urge the brake shoe 13 into engagement with the drum. At this time, the reinforcing plate 18 and web 16 will move away from the anchor pin 19, the amount of this movement being dependent upon the degree of wear of the lining 14. If sufficient wear has taken place, the adjusting link 25, which is inextensible, will rotate the adjusting lever 33 in a counterclockwise direction relative to the pivot axis determined by the spring retainer 35. The end 48 will then engage and rotate the star wheel 28 an amount sufficient to achieve the adjustment. If the adjustment can be effected, the spring 44 will hold the supporting lever 34 in the position shown in FIG. 1 and this lever will not rotate. After the brake is released, the return spring 21 will draw the shoe 13 back to its retracted position and the spring 49 will return the adjusting lever 33 to a cocked position. It should be noted that due to the radius of the star wheel 28, the end 48 of the adjusting lever 33 will move in an axial direction relative to the backing plate 11. This movement is permitted due to the support of the adjusting lever 33 by the spring retainer 35. That is, the hold down spring 36 will be compressed slightly as the lever 33 follows the rotation of the star wheel 28.

If the adjusting mechanism 27 is at the extreme limit of its movement or if the star wheel 28 cannot be turned for some reason such as due to extreme uneven wear of the lining 14, the accumulation of dirt in the adjusting mechanism 27 or for some other reason, no damage will occur to the components. Under this circumstance and again assuming that the brake is engaged when the drum is rotating in the direction of the arrow 31, the adjusting link 25 will again exert a force on the adjusting lever 33 tending to rotate it in a counterclockwise direction about the spring retainer 35. However, the engagement of the lever end 48 with the star wheel 28 will provide a fulcrum point and the adjusting lever 33 will rotate in a counterclockwise direction about this fulcrum point. This movement is permitted since the supporting lever 34 will be forced to rotate in a counterclockwise direction (FIG. 2). Upon release of the brake, the spring 44 will return the supporting lever 34 to its normal position and the adjusting lever 33 will again be in its cocked position. Thus, it should be readily apparent that the pivotal movement of the supporting lever 34 precludes against any damage to the star wheel 28, adjusting mechanism 27 or the adjusting lever 33.

What I claim is:

1. In an automatic adjusting mechanism for a drum-type brake having a shoe with a frictional lining and a web, an extensible mechanism for determining the at rest position of the shoe and an adjusting lever pivotally movable in response to a predetermined amount of movement of the shoe for adjusting the extensible mechanism, the improvement comprising a supporting lever supported upon the web of the shoe for pivotal movement about a first pivot axis, means supporting said adjusting lever upon said supporting lever for pivotal movement about a second pivot axis, said adjusting lever being movable about said second pivot axis for operation of the extensible mechanism, said supporting lever being pivotal about said first axis when said adjusting lever pivots about said second axis and when said extensible mechanism cannot be extended for precluding damage to said automatic adjusting mechanism.

2. An automatic adjusting mechanism as set forth in claim 1 further including means for biasing the supporting lever for rotation about the first pivot axis in a first direction, said biasing means being yieldable for movement of said supporting lever about said first pivot axis in a direction opposite to said first pivot axis.

3. An automatic adjusting mechanism as set forth in claim 2 further including stop means on the supporting lever engageable with means on the shoe for determining the first position of said supporting lever.

4. An automatic adjusting mechanism as set forth in claim 1 further including hold down means for holding the adjusting lever in position relative to the backing plate and for holding the brake shoe in position relative to the backing plate, the hold down means including a spring retainer which forms the second pivotal axis.

5. An automatic adjusting mechanism as set forth in claim 4 further including spring means biasing the supporting lever for rotation in a first direction about the first pivot axis, said supporting lever having stop means thereon engageable with the brake shoe for determining a normal position for said supporting lever.

6. A drum type brake comprising a brake shoe having a web, an extensible mechanism in engagement with one end of said web for determining the at rest position of said brake shoe, actuating means disposed in engagement with the other end of said web for urging said brake shoe into engagement with an associated drum, said extensible means including a star wheel, an adjusting lever having an end portion adapted to engage said star wheel, a supporting lever pivotally supported upon said web, means for pivotally supporting said adjusting lever upon said supporting lever, an adjusting means operatively connected to said adjusting lever and to a fixed element of said brake for pivoting said adjusting lever about said second pivot axis for rotating said star wheel upon a predetermined degree of wear of the lining of said brake shoe, said supporting lever being pivotal about said first pivot axis when said star wheel cannot be rotated.